UNITED STATES PATENT OFFICE.

ARTHUR WEINBERG AND HANS SIEBERT, OF MAINKUR, NEAR FRANKFORT-ON-THE-MAIN, ASSIGNORS TO LEOPOLD CASSELLA & CO., OF FRANKFORT-ON-THE-MAIN, PRUSSIA, GERMANY.

MANUFACTURE OF DYE-STUFFS.

SPECIFICATION forming part of Letters Patent No. 375,848, dated January 3, 1888.

Application filed November 15, 1886. Serial No. 218,924. (Specimens.) Patented in Germany September 21, 1886, No. 2,091; in England October 9, 1886, No. 12,908, and in France October 11, 1886, No. 178,979.

*To all whom it may concern:*

Be it known that we, ARTHUR WEINBERG and HANS SIEBERT, citizens of the Kingdom of Prussia, and residents of Mainkur, near Frankfort-on-the-Main, have invented a new and useful Improvement in the Manufacture of Dye-Stuffs or Coloring-Matters, (which has been patented in France on the 11th day of October, 1886, and numbered 178,979; in Germany on the 21st of September, 1886, and numbered C 2,091, and in England on the 9th day of October, 1886, and numbered 12,908,) of which the following is a specification.

Our invention relates to a new dye stuff, which results from the reaction of tetrazo ditolyl with a new naphthylaminesulphonic acid which we have discovered, and which forms the object of a separate application for patent.

In producing this new acid we proceed as follows: We mix one part of alpha-naphthaline disulphonate of sodium with one to four parts of caustic soda of fifty per cent. and heat the mixture to about 200° centigrade until it has become quite consistent, and a sample of the smelt dissolved in water and acidulated yields to ether traces of dioxynaphthaline. We dissolve the smelt in water, acidulate it with muriatic acid, and by strong boiling cause the sulphurous acid to escape. The aqueous solution, evaporated to about fifteen parts and cooled down, separates the soda salt of a new naphtholmonosulphonic acid. Heated with ammonia, the hydroxyl group of this acid is replaced by the $NH_2$ group. For this purpose we heat one part of the naphtholmonosulphonate of soda with two parts of ammonia of twenty per cent. $NH_3$ during six hours to 250° centigrade in an autoclave. When the product of the reaction is acidulated, the new naphthylamine sulphonic acid separates in shining crystals.

In the first part of this process the quantity of alkali and the temperature may vary considerably; the caustic soda may be replaced by hydrate of potassium, and the naphthaline sulphonate of soda by other salts of the same acid. The chief point is to interrupt the smelt when dioxynaphthaline is formed, in order to avoid the reaction of Ebert and Merz, (Berichte der Deutschen Chemischen Gesellschaft, Vol. IX, page 612,) who, passing through the naphtholmonosulphonic acid, became not aware of its formation, and exclusively found dioxynaphthaline.

In the second part of our process we may as well start from the naphthaline disulphonic acid, and heat the same with NaOH and $NH_3$ or an ammonium salt, and proceed as above stated.

The alkaline solution of the salts of the new naphtholmonosulphuric acid has a pure blue fluorescence. Perchloride of iron produces in neutral solutions a dark-blue coloring. By the action of nitrous acid upon the new acid a nitroso compound is obtained, which yields a green dye-stuff by the method described in the German Patent No. 28,065. With all known diazo compounds the new acid combines in alkaline solution even diluted. The shade of the dye-stuffs is bluer than that of the corresponding dye-stuffs obtained from Schaeffer's monosulphonic acid of beta-naphthol. The new acid shows a very characteristic action upon alphadiazo-naphthaline, which produces a bluish precipitate, dyeing wool a claret-red, and upon diazo-benzole, which produces a difficultly-soluble orange of an eminent tendency to crystallize.

The aqueous solution of the salts of the new naphthylamine sulphonic acid shows a violet fluorescence. The sodium salt is difficultly soluble in water and crystallizes easily. When strongly acidulated, the naphthylamine sulphonic acid separates in crystals and gives, by addition of nitrite of soda, a clear solution of the diazo compound.

In order to obtain our new coloring-matter we proceed as follows: Twenty-one kilos of toluidine are dissolved in two hundred liters of water and twenty kilos of muriatic acid at 21° Baumé. To this solution, after being cooled down to about 4° centigrade, we add thirty kilos of muriatic acid and fourteen kilos of sodium nitrite dissolved in water. The thus-formed tetrazo compound is allowed to act upon a solution of fifty kilos of the sodium salt of our new naphthylamine sulphonic acid dissolved in five hundred liters of water, to which forty kilos of sodium acetate or thirty kilos of sodium carbonate are added. After forty-eight hours the red precipitate is filtered. The dye-stuff is easily soluble in water. In strong sulphuric acid it dissolves with a bright-blue shade, which turns into a brown one if the solution is diluted with water. It is an isomer to the dye-stuff described by Duisberg in Letters Patent No. 329,633, from tetrazo-ditolyl and beta-naphthylamine sulpho-acid; but our dye-stuff has a much greater intensity, and resists as well the action of light and of weak acids. It dyes cotton, not mordanted in a boiling bath containing any alkaline ingredient—as soda, soap, silicate, borate, phosphate, or stannate of soda—a brilliant bluish-red shade, similar to Safranine and very different from Duisberg's color.

The new product, which forms the subject of this application, is the result of the reaction of tetrazo-ditolyl upon the new naphthylamine sulphonic acid. The process herein described is a convenient method of producing that reaction. Modifications of this process and other processes to produce this reaction, and, in consequence, our product, will doubtless suggest themselves to those skilled in this special branch of chemistry.

What we claim as our invention, and desire to secure by Letters Patent, is—

As a new product, the coloring-matter herein described, which is produced by the action of tetrazo-ditolyl upon the new naphthylamine sulphonic acid herein described, substantially as herein set forth.

In testimony that we claim the foregoing as our invention we have signed our names, in presence of two witnesses, this 30th day of October, 1886.

ARTHUR WEINBERG.
HANS SIEBERT.

Witnesses:
ALVESTO S. HOGUE,
JEAN GRUND.